UNITED STATES PATENT OFFICE.

JOHANN ROBERT SONDEREGGER, OF NESSLAU, ALBERT MESSMER, OF RAPPERSWIL, AND FRIEDRICH ERDRICH, OF ZURICH, SWITZERLAND, ASSIGNORS TO CARL REINHARDT, OF BERNE, SWITZERLAND.

PROCESS FOR PRESERVING GREEN FODDER IN THE FORM OF SWEET GREEN FODDER.

1,257,754. Specification of Letters Patent. Patented Feb. 26, 1918.

No Drawing. Application filed December 19, 1917. Serial No. 207,918.

*To all whom it may concern:*

Be it known that we, JOHANN ROBERT SONDEREGGER, a citizen of the Republic of Switzerland, residing at Nesslau, in the Canton of St. Gall, Republic of Switzerland, and ALBERT MESSMER, a citizen of the Republic of Switzerland, residing at Rapperswil, in the Canton of St. Gall, Republic of Switzerland, and FRIEDRICH ERDRICH, a citizen of the Republic of Switzerland, residing at Zurich, in the Canton of Zurich, Republic of Switzerland, have invented certain new and useful Improvements in Processes for Preserving Green Fodder in the Form of Sweet Green Fodder; and we do hereby declare the following to be a full, clear, and exact description of the invention, such as will enable others skilled in the art to which it appertains to make and use the same.

This invention relates to the process for preserving green fodder in the form of sweet green fodder by stacking air-dried grass in layers in containers and applying pressure thereto.

The invention has for its object to provide an improved process of this kind whereby the entire store of fodder is caused to undergo a process of sweet fermentation, so that no sour fodder is produced in addition to the sweet green fodder and all formation of mold in the store of fodder is avoided.

In this specification, wherever temperatures are given, it is to be understood that the "centigrade" scale is used.

The objects of this invention are achieved by subjecting the layers of fodder to a differtial treatment both as regards the temperature to be reached and the pressure to be applied, in such a manner that the lowest layer, or that layer in which commences a period of fermentation after a preceding long interruption, is raised by self-heating to a temperature about 10° higher than the other layers, before it is subjected to pressure, and that each of the various layers is treated as regards the application of pressure, in such a manner that the said application of pressure is begun at the middle portion of the layer and is continued toward the edges of the layer, and that the extension of the portion to which pressure is applied is gradual as the mass of fodder subsides under the influence of the fermentation, until said pressure acts upon the said edges also.

With the object of carrying out the sweet fermentation process with certainty, in addition to the aforesaid measures, the purpose in view is also achieved by improving the soil for the action of the bacteria that are necessary for producing the desired condition of the fodder, by adding to the fodder, (particularly to those portions of it in which experience has shown to produce an imperfect fodder), a nutrient liquid for lactic acid bacteria whose activity it is desired to promote. In carrying the improved process into effect it is preferred to proceed as follows:—

The green fodder which is cut at the commencement of the chief blooming period, before being placed into the container, is converted by air-drying or sun-drying into such a condition as to reduce its contained water to about 70%, which condition is hereinafter referred to as "air-dried."

The green fodder so prepared is shaken loosely into the container designed for its treatment, preferably in such a manner that the layer of fodder will have a slight convexity at the center. Each layer of fodder is preferably made about 1½ meters in thickness. The bottom of the container is preferably first covered with a layer of straw or old hay of about 10 centimeters in thickness. The fodder soon ferments, and its temperature rises. As soon as this temperature has risen to such an extent that it is about 60–65° in the center of the layer, a new layer of fodder is thrown on to it loosely in such a manner that it also has a convexity in the center. This second layer is allowed to ferment, only until it has reached a temperature of about 50–55°. Additional layers of fodder are thereafter placed in the container in the same manner, each layer being placed in the container only after the preceding layer has reached a temperature of about 50–55°.

When the container is full, or when the working is to be interrupted for any reason, a press cover is placed upon the top layer of fodder when the latter has reached the desired temperature of 50–55°, and a pressure of 400–500 kgs. per square meter is applied to the sack of fodder. This pressure prevents an undesired rise of temperature, which would take place if the top layer of fodder were allowed to continue its self-fermentation at atmospheric pressure.

If for any reason the fodder has to be stacked in an undesirably wet state, and consequently the temperature due to self-fermentation does not rise to 50–55°, then as soon as this state of affairs takes place, the press cover is placed upon the fodder and a low pressure of say for instance 50–100 kgs. per sq. m. is applied for a period of about 12 hours. Under the influence of this low pressure which is applied to the layer of fodder by means of the press cover, the fodder experiences the desired further heating to about 50–55°. When this temperature has been reached, the above-mentioned higher pressure of about 400–500 kgs. per sq. m. is applied, and continued until the fermentation is completely spent or until a new layer of fodder is introduced into the container.

The pressure of 400–500 kgs. per sq. m. is applied always after the top layer has reached the stated temperature either when the container is quite full, or if for any reason, such as the occurrence of bad weather, no further layers of fodder can be placed in the container for a period of about 24–36 hours.

When the press cover is in operation, an appreciable quantity of moisture is condensed on the top of the last layer of fodder to a depth of about 15 cm., this being due to the circumstance that the moist vapors generated by the action of the fermentation seek to escape and are condensed near the surface. These vapors would lead to the formation of mold and therefore to avoid this, it is advisable to lift the press cover after about 12 hours from the beginning of the high pressure, for a period of about 6 hours so as to allow the vapor to escape.

The introduction of the layers in such a manner that they are convex at their center, has the result that on applying the press cover, the pressure first acts upon the center of the layer and spreads from this point at the rate as the mass of fodder subsides under the influence of the fermentation, toward the sides, and at length acts upon the peripheral portions of the layers of the fodder, thereby preventing the formation of cavities in the middle of the fodder owing to the subsidence of the latter. This is important for obtaining a stock of fodder which has been subjected throughout to sweet fermentation.

As hereinbefore stated this invention includes also the step of improving the soil for the development of the bacteria that are necessary for producing the desired condition of the fodder. For this purpose, each time a mass of fodder is charged in a layer in the container this fodder is sprinkled with the food liquid, and especially thoroughly at its edges. Preferably a further sprinkling is made just before a new layer of fodder is brought in or before pressure is applied by means of the press cover.

Although a lactic acid fermentation will occur in the green fodder without special measures being taken for that purpose, it is advisable however not to be satisfied with promoting this fermentation only by the addition of a food liquid for lactic acid bacteria, but to add together with the said food liquid also a pure culture of lactic acid bacteria, so as by this means to be independent of the lactic acid bacteria contained in the fodder which is always more or less impossible of calculation.

The production of the food liquid may for instance be as follows:

First a store of sterilized whey is prepared by freeing the whey which is a by-product of cheese manufacture, from its contained albuminous substances, first in a suitable manner, for instance by boiling and subsequent sterilization. The whey thus treated is then sterilized in a current of steam and thus rendered capable of keeping. Before use, and preferably at least 48 hours before using, the sterilized whey is inoculated with a pure culture of *Bacterium-lactici acidi* and kept in a warm place at a temperature not exceeding 40° C.

The production of pure cultures of the bacteria to be added to the whey may be made in the ordinary manner used for preparing such pure cultures. These pure cultures may also be supplied to the farmers from a central station in test tubes in a culture medium of gelatin, so that the farmer has only to melt a test tube of this kind containing a pure culture by placing it in warm water and pouring it into a stated quantity of whey, and mixing it with the latter. The whey mixed in this manner with a pure culture of bacteria is then left to itself for some time, for instance 48 hours, at an increased temperature not exceeding 40°, after which it is used for sprinkling the bottom layer and the side edges of the layers of fodder, as well as the surfaces of contact of layers of fodder which are placed upon one another after an interrupted period of working.

It may be assumed that in general 150 cub. cm. of the liquid whey containing the pure culture of bacteria will be sufficient for 1 cubic meter of fodder.

What we claim is:—

1. The process for preserving air-dried green fodder in the form of sweet green fodder in a container, which consists in stacking the air-dried fodder in the container loosely in successive layers having their greatest thickness at the center, the bottom layer being allowed to become heated by self-fermentation to a temperature of about 60 to 65 degrees centigrade before stacking the next layer upon it, and each following layer being allowed to become heated by self-fermentation to a temperature of about 50 to 55 degrees centigrade, before stacking the next layer upon it.

2. The process for preserving air-dried green fodder in the form of sweet green fodder in a container, which consists in stacking the air-dried fodder in the container loosely in successive layers having their greatest thickness at the center, the bottom layer being allowed to become heated by self-fermentation to a temperature of about 60 to 65 degrees centigrade before stacking the next layer upon it, and each following layer being allowed to become heated by self-fermentation to a temperature of about 50 to 55 degrees centigrade, before stacking the next layer upon it, and when a sufficient number of layers have been added, and the topmost layer has acquired the specified temperature of about 50 to 55 degrees centigrade, applying a high pressure of about 400 to 500 kilogs. per sq. m. to the stacked fodder, in such a manner that said high pressure acts first upon the middle of the layers and subsequently gradually is applied to the sides of the layers.

3. The process for preserving air-dried green fodder in the form of sweet green fodder in a container, which consists in stacking the air-dried fodder in the container loosely in successive layers having their greatest thickness at the center, the bottom layer being allowed to become heated by self-fermentation to a temperature of about 60 to 65 degrees centigrade, before stacking the next layer upon it, and each following layer being allowed to become heated by self-fermentation to a temperature of about 50 to 55 degrees centigrade, before stacking the next layer upon it, and when the topmost layer has acquired the specified temperature of about 50 to 55 degrees centigrade, applying a high pressure of about 400 to 500 kilogs. per sq. m. to the stacked fodder, in such a manner that said high pressure acts first upon the middle of the layers and gradually spreads to the sides of the layers, said high pressure being removed after a period of about 12 hours and an opportunity given to allow any moist vapor generated by the fermentation to escape from the stacked fodder.

4. The process for preserving air-dried green fodder in the form of sweet green fodder in a container, which consists in stacking the air-dried fodder in the container loosely in successive layers having their greatest thickness at the center, the bottom layer being allowed to become heated by self-fermentation to a temperature of about 60 to 65 degrees centigrade, before stacking the next layer upon it, and each following layer being allowed to become heated by self-fermentation to a temperature of about 50 to 55 degrees centigrade, before stacking the next layer upon it, such self-fermentation for the production of the desired heating being aided by first applying a low pressure of about 50 kilos per sq. m., and thereafter applying a high pressure of about 400 to 500 kilos per sq. m., to the stacked fodder, such high pressure being applied first at the middle portions of the layers, and gradually toward the peripheral portions thereof.

5. The process for preserving air-dried green fodder in the form of sweet green fodder in a container, which consists in stacking the air-dried fodder in the container loosely in successive layers having their greatest thickness at the center, the bottom layer being allowed to become heated by self-fermentation to a temperature of about 60 to 65 degrees centigrade before stacking the next layer upon it, and each following layer being allowed to become heated by self-fermentation to a temperature of about 50 to 55 degrees centigrade, before stacking the next layer upon it, each layer of fodder being treated with nutrient material for lactic acid bacteria.

6. The process for preserving air-dried green fodder in the form of sweet green fodder in a container, which consists in stacking the air-dried fodder in the container loosely in successive layers having their greatest thickness at the center, the bottom layer being allowed to become heated by self-fermentation to a temperature of about 60 to 65 degrees centigrade, before stacking the next layer upon it, and each following layer being allowed to become heated by self-fermentation to a temperature of about 50 to 55 degrees centigrade, before stacking the next layer upon it, each layer of fodder receiving an addition of sterilized whey as food liquid for the lactic acid bacteria.

7. The process for preserving air-dried green fodder in the form of sweet green fodder in a container, which consists in stacking the air-dried fodder in the container loosely in successive layers having their greatest thickness at the center, the bottom layer being allowed to become heated by self-fermentation to a temperature of about 60 to 65 degrees centigrade before stacking the next layer upon it, and each following layer being allowed to become heated by self-fermentation to a temperature of about 50 to 55 degrees centigrade, before stacking the next layer upon it, each layer of fodder receiving an addition of a pure culture of lactic acid bacteria in a suitable food liquid.

8. The process for preserving air-dried green fodder in the form of sweet green fodder in a container, which consists in stacking the air-dried fodder in the container loosely in successive layers having their greatest thickness at the center, the bottom layer being allowed to become heated by self-fermentation to a temperature of about 60 to 65 degrees centigrade, before stacking the next layer upon it, and each following layer being allowed to become heated by self-fermentation to a temperature of about 50 to 55 degrees centigrade, before stacking the next layer upon it, each layer of fodder receiving an addition of a pure culture of *Bacterium-lactici acidi* (*Streptococcus Güntheri*) in sterilized whey.

9. A process of preserving air-dried green fodder in the form of sweet green fodder, which comprises stacking such air-dried fodder in successive layers in a container, allowing the bottom layer to become heated by fermentation to a temperature of about 60 to 65° C., before stacking the next layer thereupon, allowing each of the successive layers above the first to become heated to a temperature of about 50 to 55° C., before stacking the next layer thereupon, and after a number of layers have been so placed, and the top layer has reached the said temperature of about 50 to 55° C., applying pressure to the stack, said pressure being applied first at the central portions of the layers, and being successively applied to points farther away from the center until it reaches the outside portions of said stack.

In testimony whereof, we have signed our names to this specification in the presence of two subscribing witnesses.

JOHANN ROBERT SONDEREGGER.
ALBERT MESSMER.
FRIEDRICH ERDRICH.

Witnesses:
HERMANN HUBER,
L. RAPHAEL GEISLER.